United States Patent [19]

Sample

[11] 4,191,330
[45] Mar. 4, 1980

[54] DRIP IRRIGATION SYSTEM FOR AGRICULTURE

[76] Inventor: Larry E. Sample, 5139 Ridge Ave. #266, Las Vegas, Nev. 89103

[21] Appl. No.: 907,686

[22] Filed: May 19, 1978

[51] Int. Cl.² .......................................... B05B 15/02
[52] U.S. Cl. ..................................... 239/66; 239/450
[58] Field of Search ................. 239/66, 70, 99, 104, 239/106, 450, 542, 547; 137/624.18, 624.2, 625.11; 251/75

[56] References Cited

U.S. PATENT DOCUMENTS

| 2,360,321 | 10/1944 | Griswold . | |
|---|---|---|---|
| 3,108,609 | 10/1963 | Schroder | 239/66 X |
| 3,797,741 | 3/1974 | Spencer | 239/70 X |
| 3,876,155 | 4/1975 | Ruben . | |
| 3,902,667 | 9/1975 | Jackson | 239/167 |
| 3,921,905 | 11/1975 | McElhoe et al. | 239/542 X |

*Primary Examiner*—Robert W. Saifer
*Attorney, Agent, or Firm*—Fishburn, Gold & Litman

[57] ABSTRACT

A drip irrigation system for agriculture comprises a plurality of water distribution lines extending across a field or similar area for growing crops. The lines are arranged in at least two separate groups, and the lines in each of the groups are interconnected. A source of pressurized, substantially unfiltered water is selectively communicated with the lines, and a plurality of water emitters are connected with and spaced along each of the lines for discharging water into the soil. Each emitter has an orifice sized to generally allow foreign material in the unfiltered water to pass therethrough. A water distributor has an inlet portion connected with the water source, and at least two outlet ports each connected with an associated one of the water line groups. A sequencing valve indexes between the first and second ports, and sequencially and individually communicates each of the line groups with the water source, whereby surges of water rush through the line to alleviate clogging of the orifices by the foreign material in the water.

12 Claims, 5 Drawing Figures

DRIP IRRIGATION SYSTEM FOR AGRICULTURE

BACKGROUND OF THE INVENTION

This invention relates to irrigation systems, and in particular to a drip irrigation system having grouped distribution lines and a sequencing water valve arrangement.

In agriculture, drip or trickle irrigation is a well known method of distributing water directly to the base or roots of plants or trees at an extremely low rate, whereby there is substantially no surface run off of the water, and evaporation of the irrigation water is minimized. To effect the slow application of irrigation water, the water distribution lines include emitters having extremely small orifices therein. Because the application rate of the water is very slow in drip irrigation, water is distributed to the soil for extended periods of time, occasionally nearly continuously, during the day to provide sufficient moisture for the crops.

Heretofore, drip irrigation systems have experienced a serious problem regarding the clogging of the small orifices in the emitters by foreign material suspended in the irrigation water. Typically, the irrigation water is supplied from a well, a reservoir, or the like, and contains a substantial amount of foreign material, such as sediment or debris in the nature of silt, clay, microorganisms, sand, etc. These foreign materials must be filtered from the irrigation water and/or the water treated with expensive chemicals to avoid clogging the emitter orifices, and to alleviate consequent maintainence and repair problems. This is particularly true in subterranean drip irrigation systems, wherein the emitters are buried beneath the surface of the soil. Subterranean drip irrigation systems are however, extremely efficient, and are particularly useful in arid regions. In present drip irrigation systems, if the foreign materials are not removed, and the emitters become clogged, repair to the system is not only time-consuming and expensive, but may result in complete crop failure or tree loss if the system is not brought to an operative condition within a relatively short period of time.

SUMMARY OF THE INVENTION

The principal objects of the present invention are: to provide a drip irrigation system for agriculture having grouped water distribution lines, with sized orifice water emitters therein, and a sequencing water valve for alternately supplying each line group and slowly applying water to the soil, yet alleviating clogging of the emitters by foreign materials in the irrigation water; to provide such a system which is particularly adapted for use in arid regions; to provide such a system which operates at conventional water line pressures for efficient irrigation; to provide such a system wherein the sequencing valve has a relatively simple design which is rugged, and provides reliable operation; to provide such a system wherein the water emitter orifices are sized to generally allow foreign material to pass therethrough to minimize emitter clogging and consequent maintenance and repair thereto; to provide such a sequencing valve which indexes between output ports associated with the individual line groups to provide surges of pressurized water to the lines to alleviate orifice clogging; to provide such a system including a surge chamber to alleviate hydraulic hammering in the water distribution lines and damage thereto; to provide such a system which is adapted to distribute substantially unfiltered irrigation water; to provide such a system having even water distribution; to provide such a system including means for adjusting the indexing of the sequencing valve; to provide such a system wherein the engaging portions of the sequencing valve are contained in a oil bath for a long operating life; and to provide such a system which is economical to manufacture, efficient in use, and particularly well adapted for the proposed use.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DESCRIPTION OF PREFERRED EMBODIMENTS

As required, detailed embodiments of the present invention are disclosed herein, however, it is to be understood that the disclosed embodiments are merely exemplary of the invention which may be embodied in various forms therefore, specific structural and functional details disclosed herein are not to be interpreted as limiting, but merely as a basis for the claims and as a representative basis for teaching one skilled in the art to variously employ the present invention and virtually any appropriately detailed structure.

Figure 1:
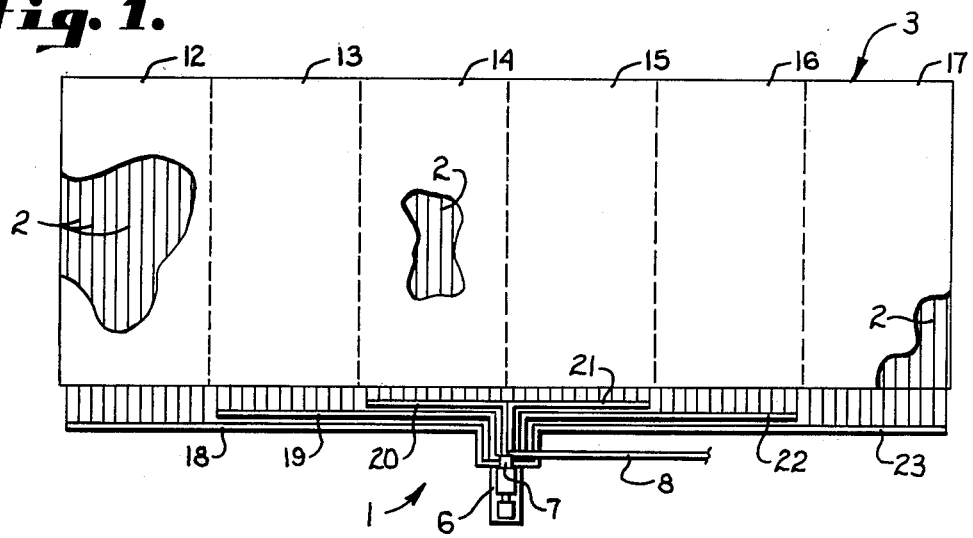
FIG. 1 is a schematic illustration of a drip irrigation system embodying the present invention.
Figure 2:
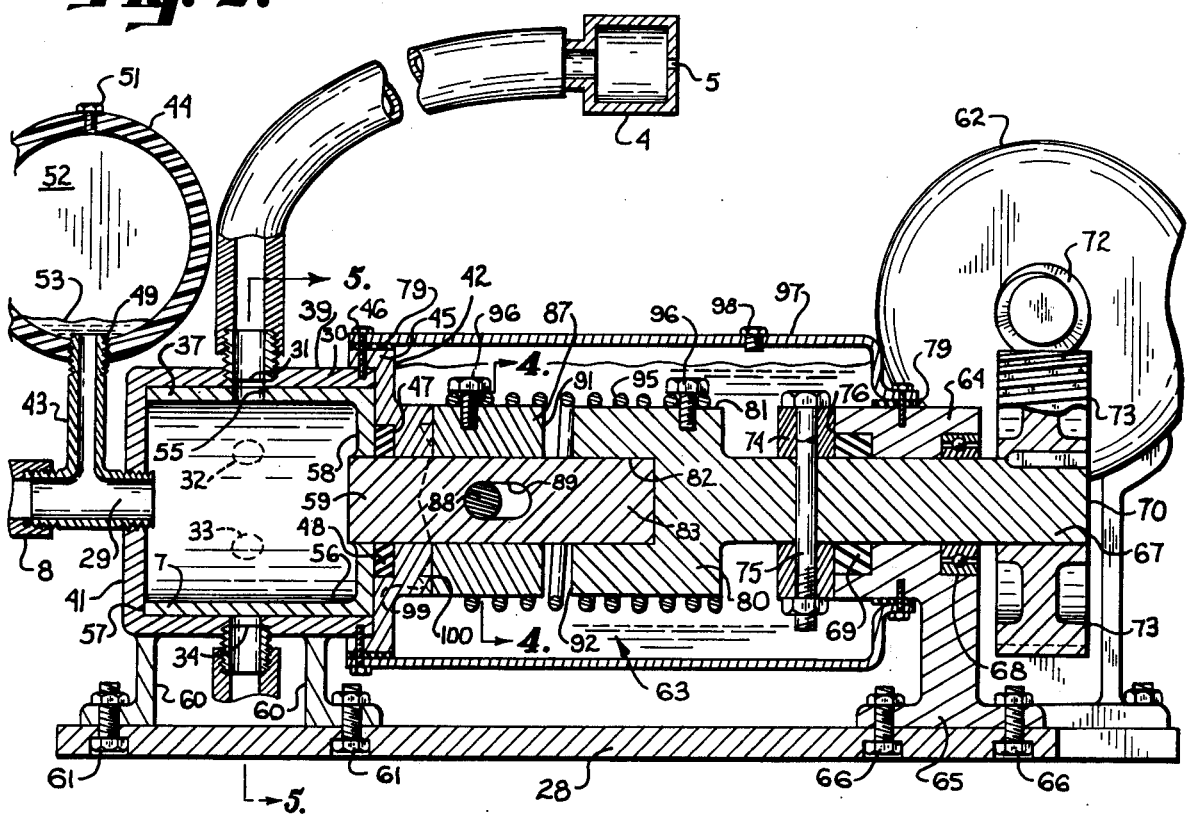
FIG. 2 is a fragmentary, vertical cross sectional view of a sequencing valve portion of the drip irrigation system, schematically showing a water emitter connected thereto.

For purposes for description herein, the terms "upper", "lower", "right", "left", "rear", "front", "vertical", "horizontal", and derivitives thereof shall relate to the invention as oriented in FIGS. 1 and 2, however, it is to be understood that the invention may assume various alternative orientations, except as expressly specified to the contrary.

The reference numeral 1 generally designates a drip irrigation system for agriculture, comprising a plurality of water distribution lines 2 extending across a field, orchard, or similar area 3 for growing crops. The distribution lines 2 are arranged in at least two separate groups, and the lines in each of the groups are interconnected. A source of pressurized, substantially unfiltered water (not shown) is selectively communicated with the lines 2 by a water main line 8. A plurality of water emitters 4 are connected with and spaced along each of the lines 2 for discharging water into the soil. Each emitter 4 has an orifice 5 sized to generally allow foreign material in the unfiltered water to pass therethrough. A water distributor 6 has an inlet portion connected with the water main line 8, and separate outlet ports connected with an associated one of the water line groups. A sequencing valve 7 indexes between the various outlet ports, and sequencially and individually communicates each of the distribution line groups with the water source, whereby surges of water rush through the lines 2 to alleviate clogging up the orifices 5 by foreign material in the water.

In the illustrated system, the crop growing area 3 is divided into six, substantially equal segments 12-17 respectively. Each of the growing segments includes a plurality of water distribution lines 2 which extend longitudinally thereacross, are oriented in a generally parallel fashion, and are spaced apart a distance predetermined in accordance with the type of crop to be grown thereon and other known variables. In each of the growing segments 12-17 the distribution lines are interconnected by a separate sub-main line 18-23 respectively, each of which is in turn connected with the water distributor 6. In this example, the irrigation system 1 is subterranean, wherein all of the water distribution lines 2 and emitters 4 thereon are buried beneath the surface of the soil. The water distribution lines 2 have a somewhat larger inside diameter than the prior art systems, so that they may provide a higher flow rate of water therethrough without substantially increasing the required line pressure. The inside diameter of the sub-main line 18-23 is substantially larger than that of the distribution lines 2 to evenly supply pressurized water to each of the distribution lines.

A plurality of the water emitters 4 are connected with and spaced along each of the lines 2 for discharging water into the soil of the crop growing area. The emitters, one of which is shown schematically in FIG. 2, have a substantially standard construction, except each has an orifice 5 which is sized to generally allow foreign materials in the substantially unfiltered water to pass therethrough, yet is sufficiently small to provide a fairly slow, even rate of flow. The emitters typically used in prior art systems, wherein irrigation is conducted substantially continuously, generally have an orifice diameter in the nature of 0.0145 inches, and a corresponding flow rate of approximately 1.0 gallon per hour. In the illustrated example, the emitter has an orifice diameter is in the nature of 0.0356 inches, and a corresponding flow rate of approximately 6.0 gallons per hour. The above noted orifice sizes and flow rates are merely exemplary of the present invention and illustrate comparative dimensions therefor, and are not intended to be limiting.

The water distributor 6 is attached to a stationary base plate 28, and includes an inlet portion 29 connected with the pressurized water main 8, and a hollow housing portion 30 communicating therewith and including a plurality of outlet ports 31-36 connected with an associated one of the water distribution line groups 12-17 respectively. A movable valve member 37 is positioned between the inlet portion 29 and the outlet ports 31-36, and indexes therebetween, thereby sequencially and individually communicating each of the water distribution line groups with the water source in a step-by-step fashion.

Figure 5:
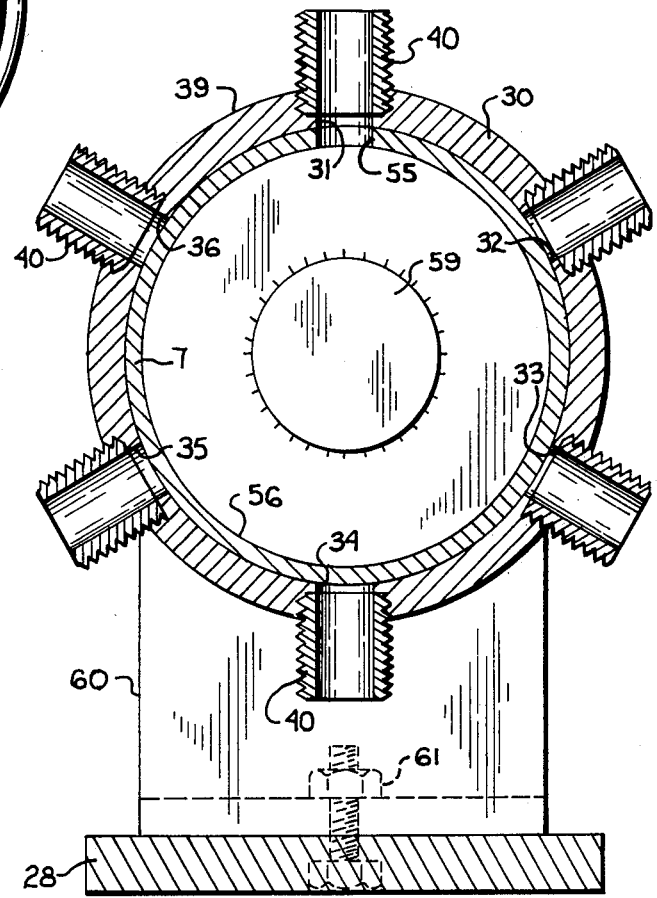
FIG. 5 is an enlarged vertical cross sectional view of the sequencing valve, taken along the line 5—5, FIG. 2.

The housing 30 illustrated in FIG. 5 comprises a cylindrically shaped structure having a sidewall 39 with the outlet ports 31-36 positioned radially therein and spaced in an equidistant fashion thereabout. A threaded fitting 40 is sealingly received in each of the outlet ports to facilitate connecting the associated sub-main line thereto. The outlet ports 31-36 preferably have a circular shape and equal diameter, and are aligned at an axial midsection of the housing 30 in a vertical plane. The housing 30 further includes an outer end 41 (FIG. 2) having a centrally disposed aperture in which the distributor inlet portion 29 is sealingly connected, and an inner end 42. In the illustrated structure, the distributor inlet portion 29 comprises a threaded, T-shaped fitting 43 having a first end attached to the outer housing end 41, a second end connected with the water main 8, and a third end attached to a surge chamber 44. The inner end 42 of the housing 30 has an annularly shaped outer flange 45 attached to the housing side wall 39 by suitable fasteners such as circumferentially spaced screws 46. The housing inner end 42 includes an annular recess 47, positioned coaxially with the sequencer valve 7 and has an oil seal 48 frictionally retained therein for purposes hereinafter described.

The surge chamber 44 is a hollow, closed vessel, which is adapted for sealingly retaining pressurized air therein. In the illustrated structure, the surge chamber 44 has a cylindrical shape, and includes a removable vent aperture and mating cap arrangement 51, whereby the volumetric portion of air and water in the surge chamber may be adjusted. The surge chamber is connected with the water inlet portion 29 by the fitting 43 and receives pressurized water therefrom and retains the water therein. An air cushion volume 52 is formed above the free surface 53 of the water for alleviating hydraulic pounding in the lines 2.

The sequencing valve 7 comprises a cylindrically shaped rotor rotatably mounted in the housing 30, and includes a single, radially extending distribution port 55 which is shaped to selectively mate with each of the outlet ports 31-36 respectively. The rotor 7 includes a sidewall 56 in which the distribution port 55 is positioned at an axially medial location, a free edge 57 positioned adjacent to the inside surface of the outer housing end 41, and an end wall 58 having a shaft member 59 fixedly connected coaxially therewith and extending rearwardly thereof. The outer surface of the rotor sidewall 56 is disposed adjacent to the inner surface of the housing sidewall 39, with just sufficient clearance thereinbetween for the two members to rotate freely relatively to each other, thereby forming a seal therebetween. The illustrated housing 30 is attached to the base plate 28 by a pair of depending legs 60 having suitable fasteners, such as bolts 61 attaching a lower flange portion thereof to the base plate.

The water distributor 6 includes a motor 62 and an indexing mechanism 63 interconnecting the motor with the rotor 7, and pivoting the same, whereby the dispensing port 55 selectively and cyclically aligns with one of the outlet ports 31-36 for directing water therethrough, and simultaneously closes all of the other outlet ports. The motor 62 is preferably electric powered, and may include means such as a rheostat for controlling drive speed. The power source for the motor 62 may comprise storage batteries for use in remote areas. The indexing mechanism 63 includes a rearward stand or support 64 having a lower flange portion 65 thereof attached to the base plate 28 by suitable fasteners, such as bolts 66. The support 64 includes an axial aperture therethrough in which drive shaft 67 is mounted by an antifriction bearing 68 positioned on the rearward side of the support 64. An oil seal 69 is disposed on the inside portion of the support 64 and seals about and against the outer surface of the drive shaft 67. The outer end 70 of the drive shaft 67 is connected with the motor 62 and slowly rotates the same. In the illustrated structure, the motor 62 is positioned perpendicular to the distributor drive shaft 67, and includes a worm gear 72 entrained in a mating worm wheel 73 which is attached to the drive shaft outer end 70 for rotation therewith. An annularly shaped thrust ring or bearing 74 is attached to the drive shaft 67 for rotation therewith by a through-bolt 75. The thrust bearing 74 is positioned adjacent to the inside end surface 76 of the support 64 and abuttingly mates therewith to restrain outward axial translation of the drive shaft 67.

Figure 4:
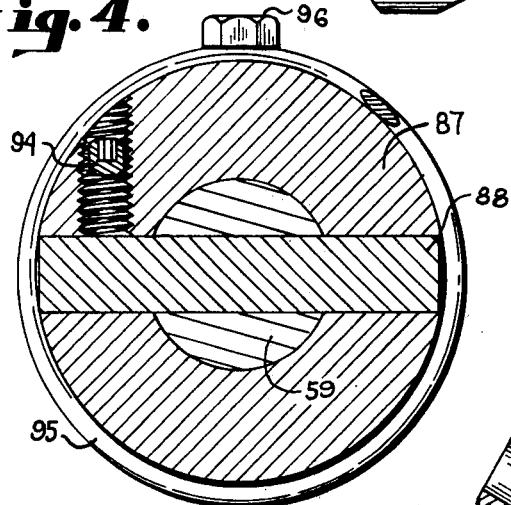
FIG. 4 is an enlarged, vertical cross sectional view of the sequencing valve taken along the line 4—4, FIG. 2.

The inward end of the drive shaft 67 includes an enlarged cylindrically shaped end portion 80 having an outer surface 81 and an axially positioned inner recess 82. The rotor shaft 59 extends through the seal 48, and the free end thereof is rotatably received in the shaft recess 82. A sleeve member 87 is mounted on the medial portion of the rotor shaft 59, and includes an outer surface which is substantially coextensive with the surface 81. The sleeve 87 is attached to the rotor shaft 59 by a pin 88 which extends diametrically through the sleeve 87 and an elongated slot 89 in the rotor shaft, whereby the sleeve rotates with the shaft 59 and may translate axially with respect therethrough. As best illustrated in FIG. 4, the pin 88 is detachably connected with the sleeve 87 by a threaded set screw 94. The inward end surface 91 (FIG. 2) of the sleeve 87 is spaced apart from the inward end surface 92 of the shaft 67 to allow the sleeve 87 to translate axially on the shaft 59 with respect to the inner housing end 42. A resilient member, such as the illustrated helical coil spring 95 has one end thereof attached to the shaft 67, and the other end attached to the sleeve 87, whereby the coil spring transmits rotational torque applied to the shaft 67 by the motor 62 to the sleeve 87 and rotor shaft 59. The coil spring bridges or extends between the space between surfaces 91 and 92, and urges the sleeve 87 toward the housing inner end 45, and has the ends thereof detachably connected to their respective members by suitable fasteners such as the illustrated bolts 96. The illustrated coil spring 95 is positioned around, winds about, and is concentric with the outer surface of the sleeve 87 and shaft end 80. The spring 95 is preferably preset in a slightly compressed position.

A casing or cover 97 extends between and is attached to the inner housing end 46 and the support member 64, and surrounds or encases the coil spring 95, and other moving interior portions of the distributor. As best illustrated in FIG. 2, a seal 79 is provided at each end of the casing which is in turn attached to the support members 64 and 45 by suitable fasteners, and forms a closed chamber for retaining a lubricant such as oil. The illustrated oil chamber is filled to a level above the coil spring 95, and includes a filler aperture and mating closure 98 therefor. The oil bath protects the interior moving parts from oxidation, and decreases wear.

Figure 3:
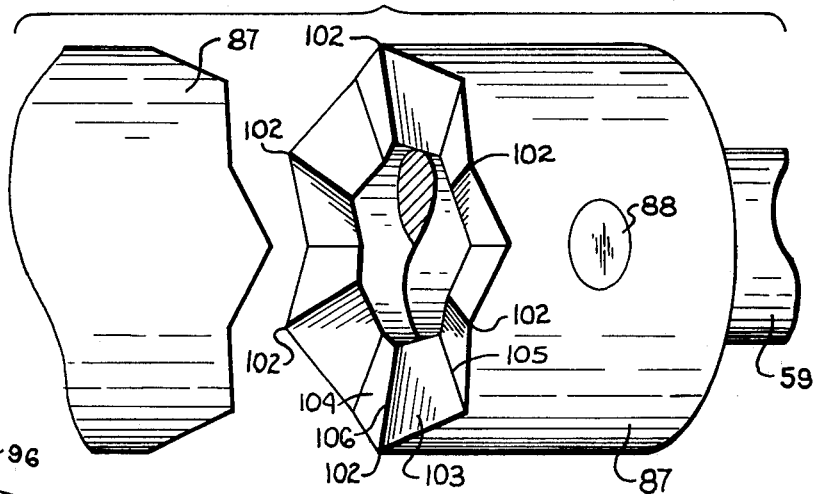
FIG. 3 is an enlarged, fragmentary, exploded view of an indexing portion of the sequencing valve.

As best illustrated in FIG. 3, the housing inner end 45 and the sleeve 87 each include a friction plate surface 99 and 100 respectively which are mutually engaging and mating. The illustrated friction plate surfaces include a predetermined number of radially oriented, inclined teeth 102 formed by a pair of intersecting dihedral surfaces 103 and 104. The teeth 102 are inclined outwardly from a root portion 105 formed by the intersection of adjacent dihedral surfaces 103 and 104, and extend outwardly to a peak 106 at the intersection of a second pair of dihedral surfaces. Each of the friction plates contains an equal number of identically shaped teeth, and the number of teeth on each friction plate is equal to the number of outlet ports required for a specific system. In the illustrated system, the crop growing area 3 is divided into six segments, thereby requiring six sub-mains 18-23, and six outlet ports 31-36. Hence, the friction plates 99 and 100 each contain six teeth which are arranged in a radially regular pattern thereon, and the peaks 106 of the friction plate 99 are disposed in the associated root portions 105 of the friction plate 100 when the distribution port 55 is aligned with one of the outlet ports 31-36. The coil spring 95 urges the mating friction plates 99 and 100 into abutting, selectively locking engagement, whereby motor rotation tenses the coil spring and applies a resilient torque to the sleeve 87, which torque is selectively resisted by the engaging friction plates 99 and 100. When the torque applied to the sleeve 87 reaches a predetermined level, the sleeve 87 will translate rearwardly with respect to the rotor shaft 59 and simultaneously rotate in the direction in which the torque is being applied, and reengage or index into the next set of teeth in the friction plate 99. In this manner, the distribution port 55 is aligned directly with one of the outlet ports, and is quickly rotated or indexed into a second, aligned position with a different one of the outlet ports. This indexing action provides a pulse of rushing water into each of the lines, and simultaneously closes the non-aligning ports.

In use, the crop growing area is first divided into a number of appropriately sized sections. The size of the section is selected in accordance with the type of crop to be grown, the growing climate, and other such variables. The water distribution lines 2 are positioned in each crop growing segment, and the lines in each of the segments are interconnected by the sub-mains 18-23. The number of growing segments in each area is selected to be equal to the number of teeth provided on the mating friction plates 99 and 100. In this example, there are six growing segments 12-17, and each friction plate has six teeth 102. The free end of each of the sub-main lines 18-23 is then connected to one of the fittings 44 associated with the water distributor outlet ports 31-36 respectively. The emitters 4 are installed in a spaced apart fashion along each of the distribution lines 2 in a conventional fashion. The source of pressurized irrigation water is connected with the inlet fitting 29 of the water distributor through main line 8. The motor 62 is then activated, and rotational motion is transmitted through the worm and helically gear arrangement 72 and 73, and imparts a slow rotational movement to the drive shaft 67. In the position illustrated in FIG. 2, the distribution port 55 is aligned with the outlet port 31, and a surge of pressurized water is applied through the sub-main line 18 to the distribution lines and emitters disposed in the growing section 12. The axial force applied by the coil spring 95 causes pressure between the friction plates 99 and 100, thereby resisting the rotational torque applied to the sleeve 87 by the rotation of drive shaft 67. As the rotation of the drive shaft 67 continues, additional torque is applied to the sleeve 87 through the coil spring 95, and eventually reaches a predetermined level, wherein the abutting teeth surfaces slide over each other, and the sleeve translates rearwardly (to the right as viewed in FIG. 2) with respect to the rotor shaft 59 and simultaneously rotates. The sleeve teeth then disengage the associated teeth on the friction plate 99, and reengage the next set of teeth on friction plate 99, thereby quickly indexing or rotating the distribution port 55 into alignment with the outlet port 32. The rapid indexing action of the distributor causes the water to momentarily surge through the distributor lines and emitters, under uniform pressure for even, consistent, efficient irrigation. The water surges cause a purging or self-flushing action in the emitters which keeps them free from clogging with foreign materials, whereby the system may be installed in the efficient subterranean mode without the heretofore consequent drawback of difficult and expensive repair due to clogging. Slow, constant rotation of the distribution port 55 would allow much of the irrigation water to escape from the emitter orifices at pressures far below those required for maximum irrigation efficiency, and would not provide water surges to purge the emitters. Continued rotation of the drive shaft 67 causes the rotor 7 to similarly rotatably index into alignment with each of the remaining outlet ports 31-36, whereby each of the growing sections 12-17 is communicated with the water source for an equal period of time and receives an equal amount of irrigation water. In this manner, each of the growing sections 12-17 is individually irrigated for a relatively short period of time, such as 1-3 minutes, at a correspondingly increased flow rate, and the irrigation is regularly repeated in sequence with irrigation to the other growing segments.

As the rotor 7 indexes from outlet port to outlet port, the flow of water into the housing is abrutly interrupted. Since the flow rate of the water flowing into the distributor is rather high, as is the inertia of the water, the sudden indexing interruptions would likely cause hydraulic pounding in the distributor, which may in turn result in damage to the pipes. The surge chamber 50 absorbs the shock forces imparted by the interrupted water and substantially alleviates hydraulic pounding. The amount of air in the surge tank 50 may be adjusted by manipulating vent cap 51 to control the level of the air cushion therein. The indexing of the friction plate 99 and 100 may be adjusted by adjusting the effective length of the coil spring 95. By loosening one of the bolts 96 and rotating the shaft 67, whereby the coil spring is further compressed, the engagement between the friction plate 99 and 100 is made more positive to insure registry with each of the friction plate teeth.

It is to be understood that while I have illustrated and described certain forms of my invention, it is not to be limited to the specific forms or arrangement of parts herein described and shown.

What I claim and desire to secure by Letters Patent is:

1. A drip irrigation system for agriculture, comprising:
   (a) a plurality of water distribution lines adapted for extending across an area for growing crops; said lines being arranged in at least first and second separate groups thereof, wherein the lines in each of the groups are interconnected;
   (b) a water source of pressurized, substantially unfiltered water selectively communicating with said water distribution lines;
   (c) a plurality of water emitters connected with and spaced along each of said lines for discharging the water in said lines into the soil of the crop growing area; said emitters each having an orifice sized to generally allow foreign materials in said substantially unfiltered water to pass therethrough;
   (d) a water distributor including:
      (1) an outlet portion with first and second outlet ports connected with said first and second water line groups, respectively, and which has a hollow housing portion wherein said first and second ports are disposed, said housing portion having a cylindrical bore;
      (2) a sequencing valve having a cylindrical rotor with a hollow interior and which is coaxially mounted within said bore of the housing for turning of the rotor therein, said rotor having a dispensing port in the wall thereof selectively and cyclically alignable with one of said first and second ports in said housing portion for directing water therethrough while simultaneously closing the other of said first and second ports, said cylindrical rotor being adapted to index between said first and second ports and sequentially and individually communicate said first and second water distribution line groups with said water source, whereby surges of pressurized, substantially unfiltered water rush cyclically through said lines to alleviate clogging of the orifices by foreign material in the water; and
      (3) an inlet portion connected with said water source, and wherein said inlet portion leads into the hollow interior of said cylindrical rotor.

2. A system as set forth in claim 1 including:
   (a) a motor having a substantially constant rotational shaft speed;
   (b) an indexing mechanism interconnecting said motor and said rotor.

3. A system as set forth in claim 2 wherein said indexing mechanism comprises:
   (a) a resilient member having first and second ends; said resilient member first end being connected with said motor;
   (b) first and second friction plates having mating releasably engaging surfaces; said first friction plate being connected to said rotor for rotation and axial translation therewith, and said second friction plate being mounted in said housing portion and stationary with respect to said first friction plate; said resilient member second end being connected with said first friction plate, whereby motor rotation tenses said resilient member and applies a resilient torque to said first friction plate and sequentially rotates said rotor in a step-by-step fashion.

4. A system as set forth in claim 1 including:
   (a) a surge chamber connected with said housing and adapted for receiving the water therein; said surge chamber being closed with an air cushion volume above the free surface of the water therein for alleviating hydraulic pounding in said water distribution lines.

5. A system as set forth in claim 4 wherein:
   (a) said surge chamber includes a removable vent cap for adjusting the air cushion volume.

6. A system as set forth in claim 1 wherein said sequencing valve includes:
   (a) a rotor having a dispensing port therein selectively and cyclically aligning with one of said first and second ports for directing water therethrough, and simultaneously closing the other of said first and second ports.

7. A system as set forth in claim 1, wherein in each of said groups, said lines are adjacently disposed.

8. A drip irrigation system for agriculture, comprising:
   (a) a plurality of water distribution lines adapted for extending across an area for growing crops; said lines being arranged in at least first and second separate groups thereof, wherein the lines in each of the groups are interconnected;

(b) a water source of pressurized, substantially unfiltered water selectively communicating with said water distribution lines;

(c) a plurality of water emitters connected with and spaced along each of said lines for discharging the water in said lines into the soil of the crop growing area; said emitters each having an orifice sized to generally allow foreign materials in said substantially unfiltered water to pass therethrough;

(d) a water distribution including:
  (1) an inlet portion thereof connected with said water source;
  (2) an outlet portion with first and second outlet ports connected with said first and second water line groups, respectively, said outlet portion having a hollow housing portion in which said first and second ports are disposed;
  (3) a sequencing valve disposed between said inlet and outlet portions and which indexes between said first and second ports and individually communicates said first and second water distribution line groups with said water source, whereby surges of pressurized, substantially unfiltered water rush cyclically through said lines to alleviate clogging of the orifices by foreign material in the water, said sequencing valve having a rotor mounted in said housing portion for rotation, said rotor having a dispensing port therein selectively and cyclically aligning with one of said first and second ports for directing water therethrough, and simultaneously closing the other of said first and second ports;
  (4) a motor having a substantially constant rotational shaft speed;
  (5) an indexing mechanism interconnecting said motor and said rotor, said indexing mechanism having first and second friction plates with mating releasably engaging surfaces, said first friction plate being connected to said rotor for rotation and axial translation therewith, and said second friction plate being mounted in said housing portion and stationary with respect to said first friction plate;
  (6) a resilient member having first and second ends, said resilient member being connected with said motor and with said resilient member second end being connected with said first friction plate, whereby motor rotation tenses said resilient member and applies a resilient torque to said first friction plate and sequentially rotates said rotor in a step-by-step fashion.

9. A system as set forth in claim 8 wherein:
(a) said resilient member comprises a helical coil spring.

10. A system as set forth in claim 9 including:
(a) means adjusting the effective length of said coil spring for controlling the indexing of said sequencing valve.

11. A system as set forth in claim 10 wherein:
(a) said friction plate surfaces each include a preselected number of radially oriented, inclined teeth which are resiliently urged into a mating position by the coil spring.

12. A system as set forth in claim 8 including:
(a) an oil bath housing encasing said friction plates and said coil spring.

* * * * *